US006987719B2

(12) United States Patent
Mashimo

(10) Patent No.: US 6,987,719 B2
(45) Date of Patent: Jan. 17, 2006

(54) OPTICAL DISK DEVICE

(75) Inventor: Akira Mashimo, Tokorozawa (JP)

(73) Assignee: TEAC Corporation, Tokyo (JP)

( * ) Notice: Subject to any disclaimer, the term of this patent is extended or adjusted under 35 U.S.C. 154(b) by 63 days.

(21) Appl. No.: 10/082,128

(22) Filed: Feb. 26, 2002

(65) Prior Publication Data

US 2004/0196754 A1    Oct. 7, 2004

(30) Foreign Application Priority Data

Feb. 26, 2001  (JP) .............................. 2001-051095

(51) Int. Cl.
*G11B 7/00*   (2006.01)
(52) U.S. Cl. ............................. 369/53.34; 369/44.13; 369/47.22
(58) Field of Classification Search ............ 369/53.34, 369/44.13, 47.22, 47.48
See application file for complete search history.

(56) References Cited

U.S. PATENT DOCUMENTS

| 4,764,913 | A | | 8/1988 | Sasaki et al. | |
|---|---|---|---|---|---|
| 5,459,706 | A | * | 10/1995 | Ogawa et al. | ........... 369/53.31 |
| 5,835,478 | A | * | 11/1998 | Kobayashi et al. | ...... 369/275.3 |
| 6,246,649 | B1 | * | 6/2001 | Ohta et al. | ............... 369/47.28 |

FOREIGN PATENT DOCUMENTS

| JP | 62-172570 | | 7/1987 |
|---|---|---|---|
| JP | 11-086417 | | 3/1999 |
| JP | 11-161961 | | 6/1999 |
| JP | 11-250462 A | | 9/1999 |
| JP | 2000-207745 A | | 7/2000 |
| JP | 2001043614 A | * | 2/2001 |

* cited by examiner

*Primary Examiner*—David Hudspeth
*Assistant Examiner*—Adam R. Giesy
(74) *Attorney, Agent, or Firm*—Christensen O'Connor Johnson Kindness PLLC

(57) ABSTRACT

An optical disk drive capable of securing reliable reproduction of a wobble signal even under a constant angular velocity control of a recordable or rewritable optical disk is disclosed. The optical disk has a guide track wobbled to produce a constant frequency when the optical disk is driven under a constant linear velocity control. An optical pickup unit detects the light reflected from the optical disk, and a wobble signal reproducing section takes out a wobble signal. The wobble signal reproducing section has two band-pass filters; a first band-pass filter detects a center frequency of the wobble signal, which is caused to vary under the constant angular velocity control, and a second band-pass filter has a center frequency set to the detected center frequency whereby the wobble signal is extracted by the second band-pass filter. The extracted wobble signal is subsequently demodulated address information.

3 Claims, 6 Drawing Sheets

OPTICAL DISK DEVICE

BACKGROUND OF THE INVENTION

1. Field of the Invention

The present invention relates generally to an optical disk device, and more particularly to the reproduction a wobble signal in an optical disk device used with a recordable or rewritable optical disk such as a CD-R (compact disk recordable) or a CD-RW (compact disk rewritable).

2. Description of the Related Art

Conventionally, in a recordable or rewritable optical disk such as a CD-R, CD-RW, DVD-R, DVD-RW, or DVD-RAM (digital versatile disk random-access memory), guide tracks are "wobbled" so as to record ATIP (absolute time in pregroove) or ADIP (address in pregroove) on the pregroove. The ATIP or the ADIP (hereinafter referred simply to as "address information" is used to acquire the current position of the optical disk, and according to this address information, a control of the recording or reproduction is performed.

The address information can be reproduced by taking out wobble components contained in an electric signal that can be obtained by receiving the light reflected from the optical disk. For example, in the case where a photodetector comprised of four quadrant photodiodes (having light receiving surfaces A, B, C and D) is used under the condition that the light receiving surfaces combination A, D and the light receiving surfaces combination B, C are divided in a radial direction of the optical disk, the signals that can be obtained with respect to the two divided light receiving surfaces combinations are in phase when the reflected light, EFM-modulated (eight to fourteen modulation) depending on the presence of a pit, is received, whereas wobble signals with respect to the two divided light receiving surfaces combinations are 180° out of phase. Accordingly, by determining the difference between the output signals of the respective two divided light receiving surfaces, it is possible to remove EFM-modulated components, thereby taking out a wobble signal alone.

FIG. 6 shows in block diagram a wobble signal reproducing system incorporated in a conventional optical disk device. Two photodetectors A and B divided in the radial direction of an optical disk receive the light beams reflected from the optical disk and output electric signals corresponding to intensities of the reflected light beams (in the case of quadrant photodetectors, it may be considered that two light receiving surfaces together form a photodetector A, and remaining two light receiving surfaces together form the other photodetector B). The output signal of the photodetector B is supplied to a sample-hold circuit (S/H) 50, and the output signal of the photodetector A is supplied to a sample-hold circuit (S/H) 52. The sample-hold circuits 50, 52 are supplied with a sampling pulse, which is synchronized with the timing of a light beam having a reproduction power. Based on the sampling pulse, the sample-hold circuits 50, 52 perform sampling of the output signals during a period of the light beam with reproduction power.

The sampling during the period of the light beam having reproduction power is achieved for a recording operation in which a light beam with a recording power and a light beam with a reproduction power are alternately irradiated on to the optical disk. In a playback operation where information recorded on the optical disk is read out, the light beam irradiated on the optical disk always has a reproduction power. Accordingly, the sample-hold circuits 50, 52 can be passed over.

The signals that have been sampled and held by the sample-hold circuits 50, 52 are supplied to amplifiers 54, 56 where they are amplified at a predetermined amplification factor or gain. The outputs from the respective amplifiers 54, 56 are then supplied to a differentiator 58, which determines the difference between the two signals to remove EFM-modulated components. The output signal of the differentiator 58 is supplied to a band-pass filter (BPF) 60. The BPF 60 extracts from the input signal only components of frequencies near a predetermined wobble frequency (22 kHz, for example) and outputs the extracted components as a wobble signal. In the case where the address information is modulated by a frequency-shift keying (FSK) method in which two FSK frequencies are 21 kHz and 23 kHz with a center frequency being 22 kHz, the BPF 60 is designed to have a narrow pass band (with a bandwidth of ±1 kHz) at the center frequency (filter center frequency) of 22 kHz. By thus designing the BPF 60, it is possible to extract signals with frequencies in a range of 21 kHz to 23 kHz.

As the demand for a high-speed recording operation has increased in recent years, an improvement has been proposed wherein for driving an optical disk, a constant angular velocity (CAV) control is used in place of a constant linear velocity (CLV) control in order to improve the transfer rate in the vicinity of an outer peripheral portion of the optical disk and to lower the load on a spindle motor. In this case, since the wobble signal recorded on the track is set to have a constant frequency (22 kHz) when driven under the CLV control, the driving of the optical disk under CAV control causes the center frequency of the wobble signal to vary in conjunction with the radial position of the optical disk. This makes it difficult for the BPF 60 having a narrow pass band to extract the wobble signal over the entire area of the optical disk.

It may be considered that a wobble signal to be recorded on the optical disk is adapted for the CAV control. There arises another problem that the resulting optical disk cannot maintain the compatibility with the conventional CLV control.

SUMMARY OF THE INVENTION

With the foregoing problems associated with the prior art in view, it is an object of the present invention to provide an optical disk device, which is capable of reproducing a wobble signal with reliability while maintaining the compatibility with both the CLV control and the CAV control.

To achieve the foregoing object, according to one aspect of the present invention, there is provided an optical disk device comprising: drive means for driving in rotation an optical disk having a wobbled track; irradiating means for irradiating a light beam onto the optical disk; light receiving means for receiving the light reflected from the optical disk and outputting an electric signal corresponding to the reflected light; and wobble signal reproducing means for reproducing, from the output electric signal of the light receiving means, a wobble signal corresponding to a wobble of the track, the wobble signal reproducing means including detection means for detecting a center frequency of the wobble signal, and extracting means for extracting the wobble signal from the output electric signal on the basis of the center frequency detected by the detection means.

In one preferred form of the present invention, the detection means including a band-pass filter having a pass band being set to pass the wobble signal within a range of driving in rotation of the optical disk by the drive means, and a frequency detection means for detecting a frequency of the wobble signal which has passed through the band-pass filter, wherein the extracting means extracts the wobble signal from the output electric signal on the basis of the frequency detected by the frequency detection means.

In another preferred form of the present invention, the detection means including storage means for storing a relationship between the position of irradiation of the light beam and the center frequency of the wobble signal, and calculation means for, on the basis of the relationship, calculating a center frequency of the wobble signal at a target irradiating position of the light beam to be achieved by a seek operation.

In the optical disk device, the drive means may drive the optical disk at a constant angular velocity.

Alternatively, the drive means may drive the optical disk at a constant linear velocity, in which instance the detection means performs detection of the center frequency of the wobble signal immediately after a seek operation of the irradiating means.

In the optical disk device of the present invention, when the center frequency of the wobble signal is subjected to variation, a center frequency of the wobble signal is detected first, and subsequently on the basis of the detected center frequency, the wobble signal is extracted by the extracting means such as a band-pass filter. This arrangement makes it possible to extract the wobble signal with reliability thereby to obtain address information even when the CAV control is performed with respect to an optical disk so designed as to have tracks wobbled to produce a constant frequency when driven under the CLV control.

The center frequency of the wobble signal may also vary even under the CLV control because the number of revolutions of the optical disk tends to become unstable immediately after a seek operation. In this case too, the detection means successfully detects the center frequency of the wobble signal so that address information can be obtained quickly at high speeds.

BRIEF DESCRIPTION OF THE DRAWINGS

Certain preferred embodiments of the present invention will hereinafter be described in detail, by way of example only, with reference to the accompanying drawings, in which.

DETAILED DESCRIPTION OF THE PREFERRED EMBODIMENTS

The following description is merely exemplary in nature and is in no way intended to limit the invention or its application or use.

Figure 1:
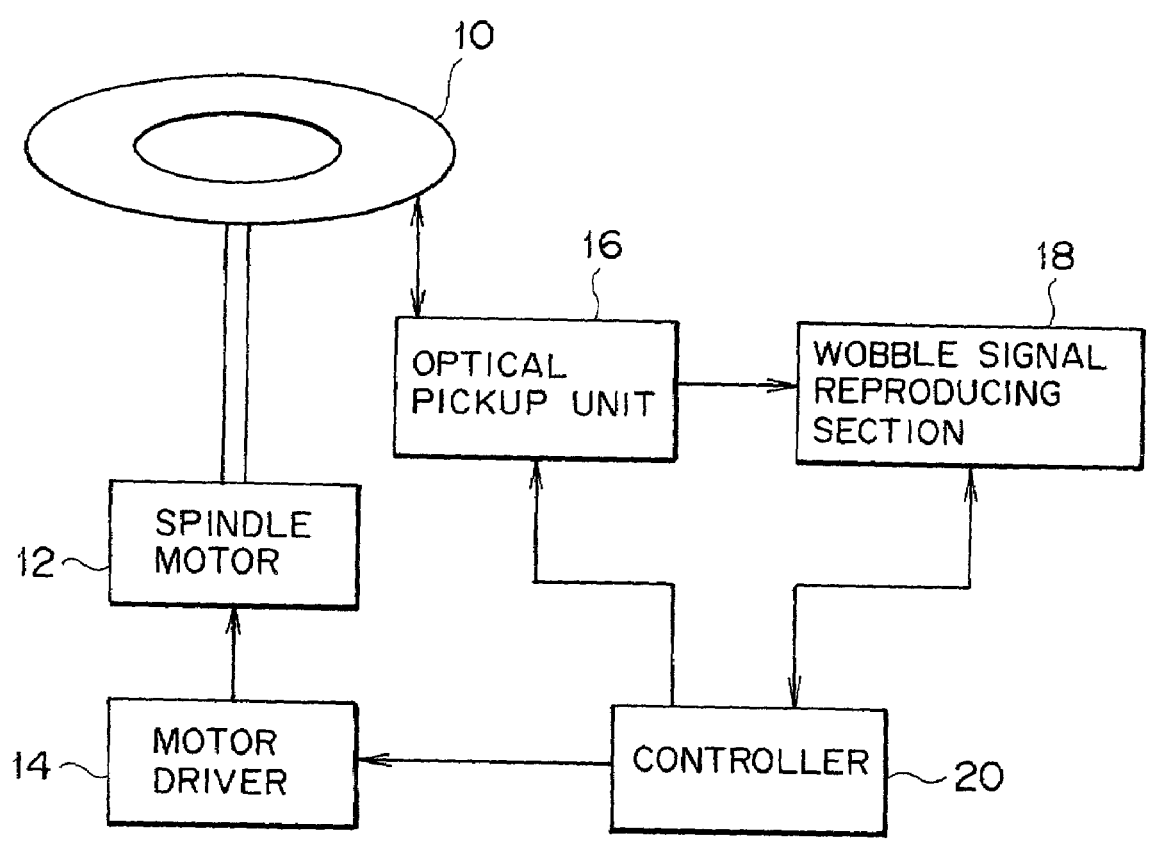
FIG. 1 is a block diagram showing the general arrangement of an optical disk device according to a first embodiment of the present invention.

Referring now to the drawings and FIG. 1 in particular, there is shown in block diagram the general arrangement of an optical disk device according to a first embodiment of the present invention. A recordable (or rewritable) optical disk 10 is formed with guide tracks wobbled in accordance with the ATIP as address information. The optical disk 10 is driven to rotate about the axis of a spindle motor 12. The spindle motor 12 is controlled on the basis of a drive control signal supplied from a motor driver 14. The motor driver 14 controls the spindle motor 12 so that the optical disk 10 rotates at a constant angular velocity (CAV).

An optical pickup section or unit 16 is disposed in a position opposite to a recording surface of the optical disk 10. Though not shown in FIG. 1, the optical pickup unit 16 comprises a laser diode (LD) that emits a light beam, a laser diode (LD) driver, an optical system that guides the light beam from the LD onto the recording surface of the optical disk and splits the reflection light reflected from a surface of the optical disk, and a plurality of photodetectors each receiving the reflection light and generating an output electric signal corresponding to the received reflection light. The optical pickup unit 16 is driven in a radial direction of the optical disk 10 by means of a feed mechanism (not shown). The LD emits a light beam having a reproduction power when a reproduction or playback operation is performed. When performing a recording operation, the LD emits a light beam having a reproduction power and a recording power higher than the reproduction power, the light beam being modulated by a recording signal. The light beam emitted from the LD is irradiated onto the optical disk 10. At the time of reproduction, the light beam irradiated on the optical disk 10 is intensity-modulated by pits and wobbled tracks formed on the optical disk 10 before it strikes on the photodetectors as reflection light. At the time of recording, the light beam irradiated on the optical disk 10 is subjected to a modulation caused due to formation of a pit on the optical disk and also subjected to an intensity modulation by the wobbled tracks. The modulated light beam then strikes on the photodetectors as reflection light. The plural photodetectors are divided into two pieces in the radial direction of the optical disk 10 and each output an electric signal corresponding to the intensity of the received reflection light. In a practical form, the photodetectors are formed of four quadrant photodiodes. For the convenience of explanation, in the illustrated embodiments, the photodetectors are comprised of a photodetector A and a photodetector B that are divided in the radial direction of the optical disk 10. Output signals of the photodetectors A and B, which are corresponding in intensity to the intensities of reflection light received on the photodetectors A and B, are supplied to a wobble signal reproducing section 18.

The wobble signal reproducing section 18 removes EFM-modulated components contained in the output signals of the photodetectors A and B thereby to extract a wobble signal and then demodulates address information from the wobble signal to supply the demodulated address information to a control section or controller 20. As in the case of the conventional device, the wobble signal reproducing section 18 has sample hold circuits and a band-pass filter (BPF) such that in accordance with a sampling pulse supplied from the controller 20 (in synchronism with a period of the reproduction power), sampling of the output signals is performed, followed by extraction of the wobble signal by the BPF. However, in the case of the CAV control, the center frequency of the wobble signal varies as the radial position of the optical disk 10. Accordingly, if the BPF used is of the fixed pass band type, extraction of the wobble signal is not possible. In view of this, the wobble signal reproducing section 18 according to the embodiment shown in FIG. 1 is provided with two band-pass filters. By a first band-pass filter an approximately center frequency of the wobble signal is detected, and by setting the center frequency of a second band-pass filter to the detected center frequency a wobble signal is surely extracted. The wobble signal reproducing section 18 will be described in greater detail.

The controller 20 comprises a microcomputer and controls the motor driver 14, the optical pickup unit 16 and the wobble signal reproducing section 18 in a consolidated manner. More specifically, the controller 20 concurrently undertakes a control of the feeding of the optical pickup unit 16 in the radial direction of the optical disk 10, a control of the power of LD on the basis of the recording signal, and a control of the sampling timing by supplying a sampling pulse to the wobble signal reproducing section 18. The address information obtained at the wobble signal reproducing section 18 is supplied to the controller 20 and used for controlling the current position of the optical pickup unit 16.

In practice, the output signal from the optical pickup unit 16 is supplied also to a focus error signal generating circuit and a tracking error signal generating circuit (nether shown), so that the controller 20, based on the thus supplied output signals, controls focusing and tracking of the optical pickup unit 16. The focus and tracking control of the optical pickup unit 16 is achieved in the same manner as the conventional optical disk device and further description thereof can be omitted. The output signal of the optical pickup unit 16 is also supplied to an EFM demodulation circuit (not shown) for reproducing the recorded data. The recorded data reproduction is achieved in the same manner as the conventional optical disk device, and no further description thereof is needed.

Figure 2:
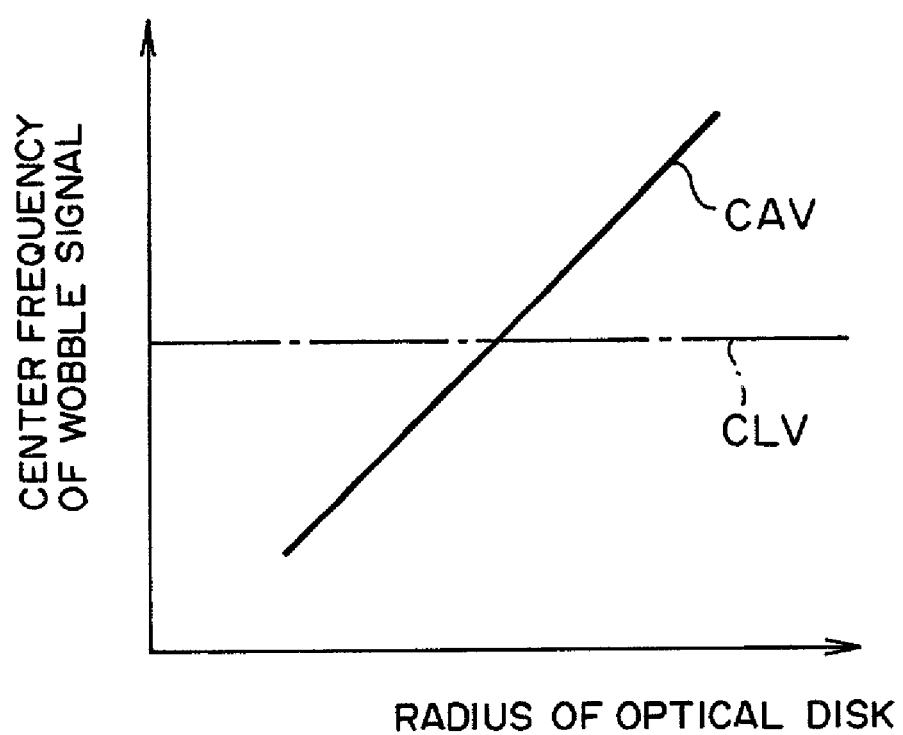
FIG. 2 is a graph showing a change in the center frequency of the wobble signal under the CLV control and CAV control.

FIG. 2 is a graph showing a change in the center frequency of the wobble signal when subjected to a CLV control and a CAV control. In FIG. 2, the horizontal axis represents the radius of the optical disk 10, and the vertical axis represents the center frequency of the wobble signal. In the case of the CLV control, the wobble signal is formed by the track wobbled in such a manner that the center frequency of the wobble signal is always constant, as indicated by the dash-and-dot line CLV. Accordingly, the center frequency of the wobble signal is constant and independent from the radius of the optical disk. In the case of the CAV control, the linear velocity increases as the position approaches the outer edge of the optical disk, and the center frequency of the wobble signal increases correspondingly. Stated more specifically, the center frequency of the wobble signal varies linearly with the radius of the optical disk, as indicated by the solid line CAV, and the center frequency at the outer edge of the optical disk approximately 2.5 times the center frequency at the inner edge of the optical disk. The wobble signal reproducing section 18 of the embodiment shown in FIG. 1 is constructed to detect a current value of the variable center frequency of the wobble signal and to set the center frequency of the BPF to the detected frequency value so as to extract the wobble signal.

Figure 3:
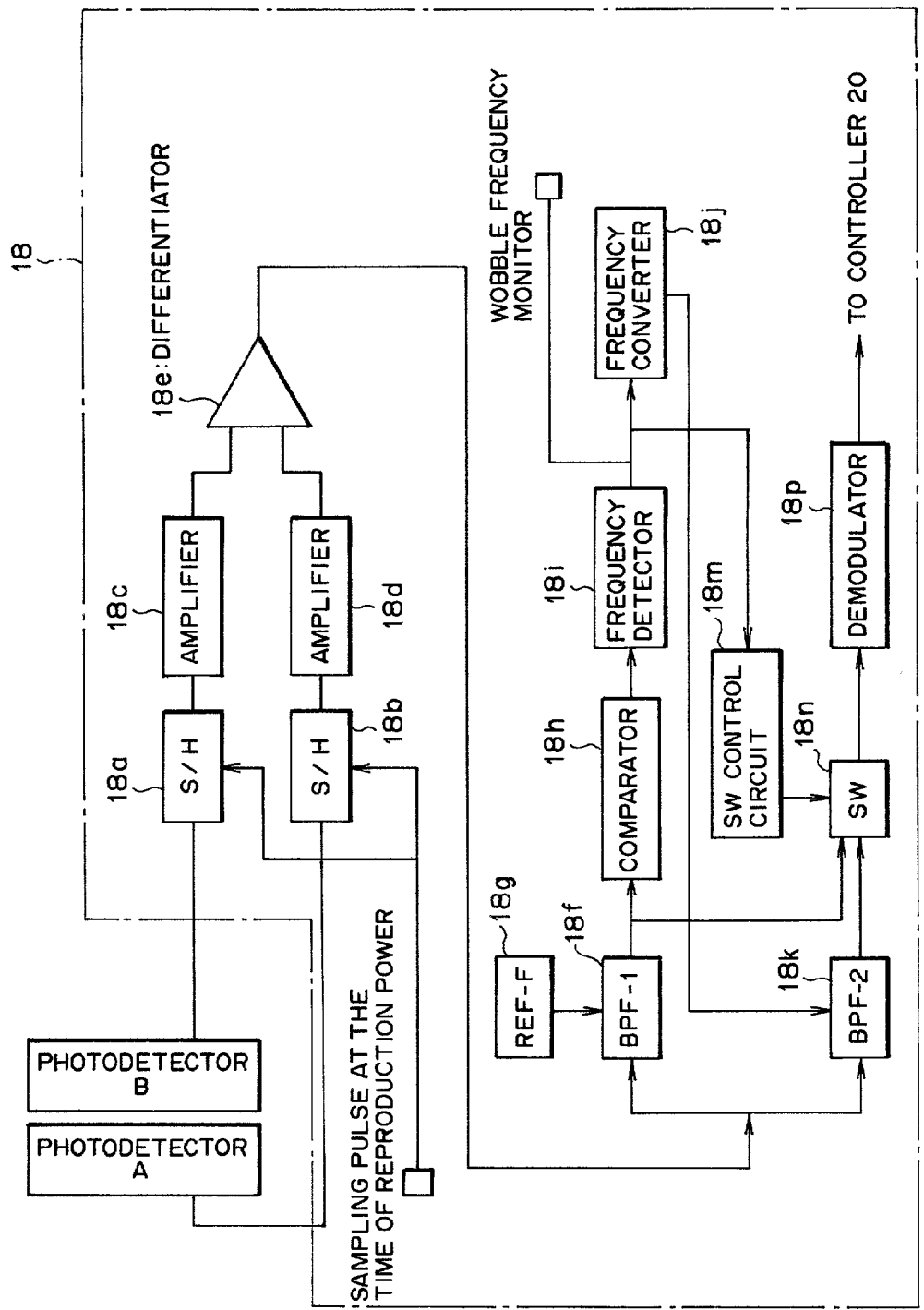
FIG. 3 is a circuit diagram showing the configuration of a wobble signal reproducing section shown in FIG. 1.
Figure 6:
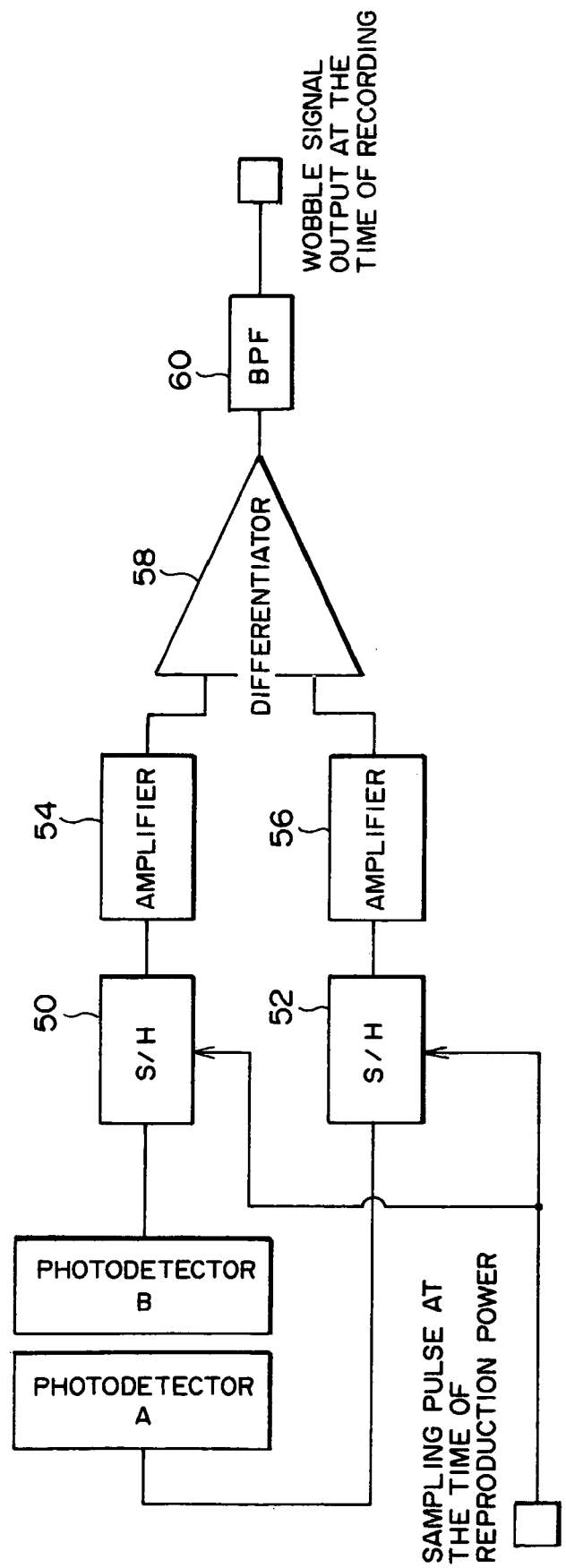
FIG. 6 is a circuit diagram showing the configuration of a wobble signal reproducing section of a conventional optical disk device.

FIG. 3 shows a circuit diagram of the wobble signal reproducing section 18 shown in FIG. 1. The wobble signal reproducing section 18 includes sample-hold circuits 18a, 18b that perform sampling and holding of the output signals from the photodetectors A and B, respectively, amplifiers 18c, 18d that amplify the outputs of the sample-hold circuits 18a, 18b, respectively, and a differentiator 18e that determines the difference between the two signals amplified by the amplifiers 18c, 18d, thereby removing EFM-modulated components. These parts 18a–18e are structurally and functionally the same as those of the conventional wobble signal-reproducing section shown in FIG. 6.

The wobble signal reproducing section 18 of the illustrated embodiment further has two frequency-controlled band-pass filters (BPFs) 18f, 18k disposed behind the differentiator 18e. The frequency-controlled band-pass filters represent a filter having a center frequency (filtering center frequency) that can be set in accordance with the frequency of an input signal (or a control signal corresponding to the frequency of an input signal). The output signal of the differentiator 18e is supplied to the first and second frequency-controlled BPFs 18f, 18k.

The first BPF 18f has a pass band so set by a frequency signal from a reference frequency generator 18g as to allow the wobble signal to pass through the first BPF 18f at any position on the optical disk being driven under the CAV control. These frequency components that are outside the frequency range indicated by the solid line CAV shown in FIG. 2 are removed as noises. Due to such broader pass band of the first BPF 18f, a signal from the first BPF 18f contains not only a wobble signal but also noises with frequencies near the frequency of wobble signal. This makes it difficult to demodulate address information at a desired error rate.

The signal from the first BPF 18f is supplied to a comparator 18h and a frequency detector 18i. By the comparator 18h and frequency detector 18i, the zero point and the cycle of the frequency of the signal that has passed through the first BPF 18f are detected to thereby detect approximately the center frequency of the wobble signal. The detected frequency of the wobble signal is output to the outside of the section 18 as a signal for monitoring the frequency of the wobble signal and also to a switch control circuit 18m and a frequency converter 18j. The switch control circuit 18m is a circuit for making a judgment as to whether or not the center frequency of the wobble signal has been detected. The frequency converter 18j supplies the second BPF 18k with a control signal corresponding to the frequency supplied to the frequency converter 18j.

The second BPF 18k, as opposed to the first BPF, is a filter having a narrow pass band. By the control signal supplied from the frequency converter 18j, the center frequency (filtering center frequency) of the second BPF 18k is set to be the frequency, i.e., the center frequency of the wobble signal, that has been detected through the first BPF 18f, comparator 18h and frequency detector 18i. With the center frequency thus set, the second BPF 18k extracts the wobble signal only from the output of the differentiator 18e. The extracted wobble signal is supplied to a switching circuit 18n.

Additional to the wobble signal supplied from the second BPF 18k, the signal from the first BPF 18f is supplied to the switching circuit 18n. The switching circuit 18n performs a switching function to selectively output one of the two signals in accordance with a switching signal supplied from the switch control circuit 18m. More specifically, when the frequency detected by the frequency detector 18i is in an allowable range of frequency variation, it is considered that the center frequency of the wobble signal is detected with accuracy. Thus, the signal from the second BPF 18k is output as a wobble signal. On the other hand, when the frequency detector 18i fails to detect the frequency in a stable manner, the signal from the first BPF 18f is transiently output as a wobble signal. In order to ensure a stable operation, when the center frequency of the wobble signal, which varies as the radius of the optical disk under the CAV control, has been detected, the switch control circuit 18m and the switching circuit 18n operate to select a high precision wobble signal from the second BPF 18k having a narrow band. Alternatively, when the center frequency of the wobble signal cannot be detected, these circuits 18m, 18n operate to select and output the wobble signal from the first BPF 18f having a broad passband. The wobble signal output from the switching circuit 18n is supplied to a demodulator 18p, which demodulates address information. The demodulated address information is supplied from the demodulator 18p to the controller 20. The switch control circuit 18m and the switching circuit 18n may be omitted in which instance the wobble signal extracted by the second BPF 18k is directly supplied to the demodulator 18p.

In the embodiment just described above, a center frequency of the wobble signal is detected by the first BPF 18f, and the center frequency of the second BPF 18k is set in accordance with the result of this detection. By virtue of the BPFs 18f, 18k, it is made possible to surely reproduce the wobble signal thereby to obtain address information rapidly with high accuracy even when the center frequency of the wobble signal is not constant but varies instead.

In the case where the optical disk is driven under the CLV control, the first BPF 18f is disabled (so as to cut all signals), and by using a control signal from the frequency converter 18j the center frequency (filtering center frequency) of the second BPF 18k is set to 22 kHz so as to extract frequencies ranging between 21 kHz and 23 kHz.

Figure 4:
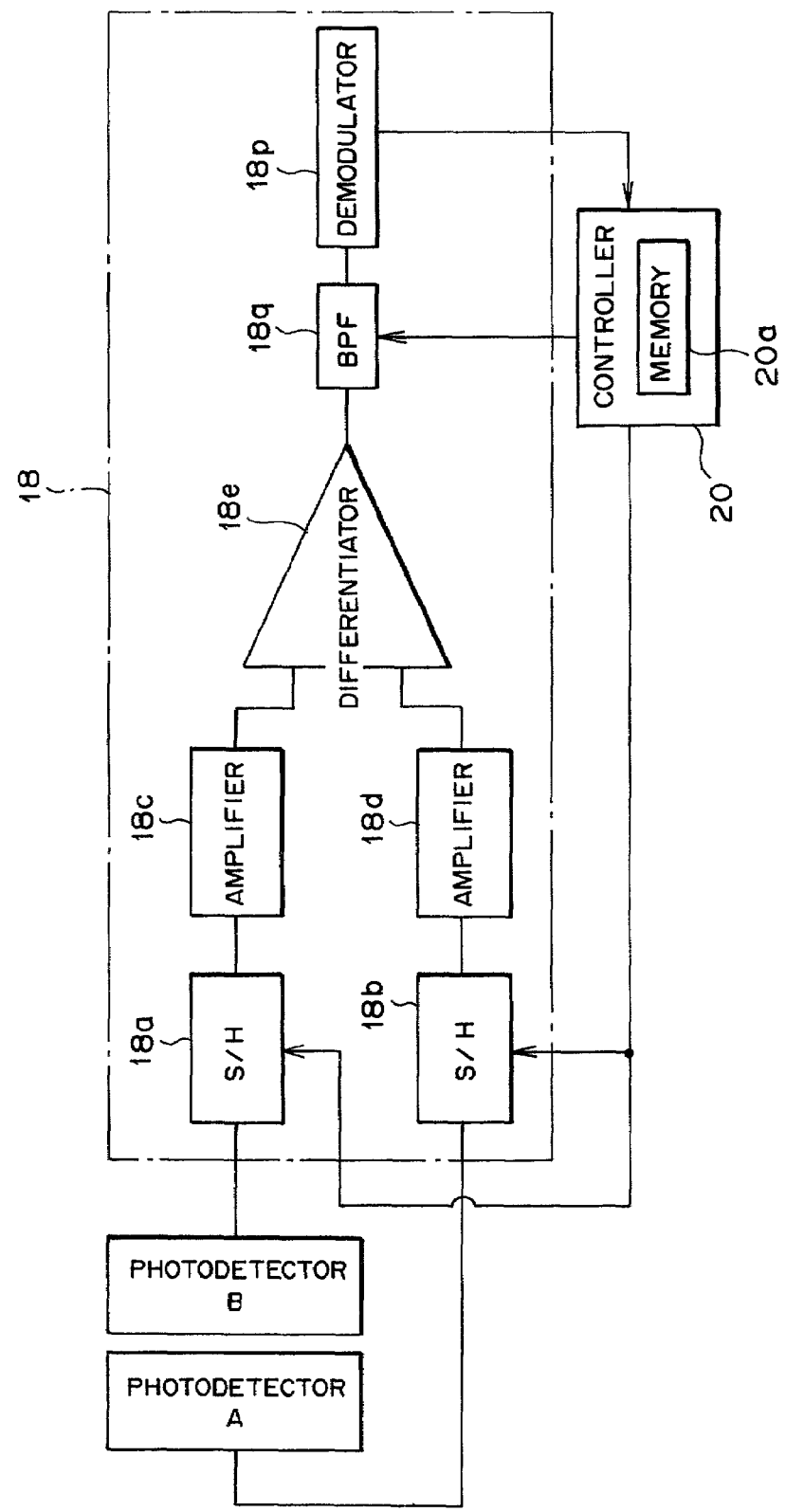
FIG. 4 is a circuit diagram showing the configuration of a wobble signal reproducing section according to a second embodiment of the present invention.

FIG. 4 shows a circuit diagram of a wobble signal reproducing section 18 according to a second embodiment of the present invention. This embodiment differs from the first embodiment described above with reference to FIG. 3 in that the wobble signal is extracted by a single band-pass filter (BPF) 18g rather than by the two BPFs in the first embodiment. Under the CAV control, the center frequency of the wobble signal varies linearly (or proportionally) with the radius of the optical disk as indicated by the solid line CAV shown in FIG. 2. This proportional relationship is determined exclusively by the angular speed of the optical disk, so that the center frequency of the wobble signal at a given position on the optical disk can be determined by calculation based on the radius of the given position. Taking this into consideration, the embodiment shown in FIG. 4 is arranged to detect the center frequency of the wobble signal by calculation, and the center frequency of the single BPF is set to the detected center frequency. With this arrangement, the wobble signal can be surely extracted, as will be understood from a description given below.

In FIG. 4, the output signals of two photodetectors A and B are supplied to sample-hold circuits 18a, 18b, respectively. In accordance with a sampling pulse supplied from a controller 20, the sample-hold circuits 18a, 18b perform sampling and holding operations on the output signals during a period of the LDs being excited with a reproduction power. The signals are this supplied to the amplifiers 18c, 18d, respectively, where they are amplified. The amplified signals are supplied to a differentiator 18e. The differentiator 18e determines the difference between the two amplified signals thereby to remove EFM-modulated components. The signal free from the EFM components is supplied to a band-pass filter (BPF) 18q. The sample-hold circuits 18a, 18b, the amplifiers 18c, 18d and the differentiator 18e operate in the same manner as those of the conventional device shown in FIG. 6.

The BPF 18q is a frequency-controlled band-pass filter having a pass band with a center frequency that can be set in accordance with a control signal supplied from the controller 20. When a seek command to move a optical pickup unit 16 (not shown but identical to the one 16 shown in FIG. 1) to a address position as required is received, the controller 20 calculates, from a target address contained in the seek command, a radial position on the optical disk corresponding to the target address, and further calculates a center frequency of the wobble signal at the calculated radial position on the optical disk. Subsequently, the controller 20 supplies a control signal corresponding to the calculated center frequency to the BPF 18q. In this embodiment, the controller 20 functions as a detection means for detecting a center frequency of the wobble signal. This forms a contrast to the first embodiment shown in FIG. 3, wherein the first BPF 18f, comparator 18h and frequency converter 18i function as a detection means for detecting a center frequency of the wobble signal. The BPF 18q extracts a wobble signal at a center frequency set on the basis of the control signal supplied from the controller 20. The extracted wobble signal is supplied to a demodulator 18p, which demodulates address information.

Figure 5:
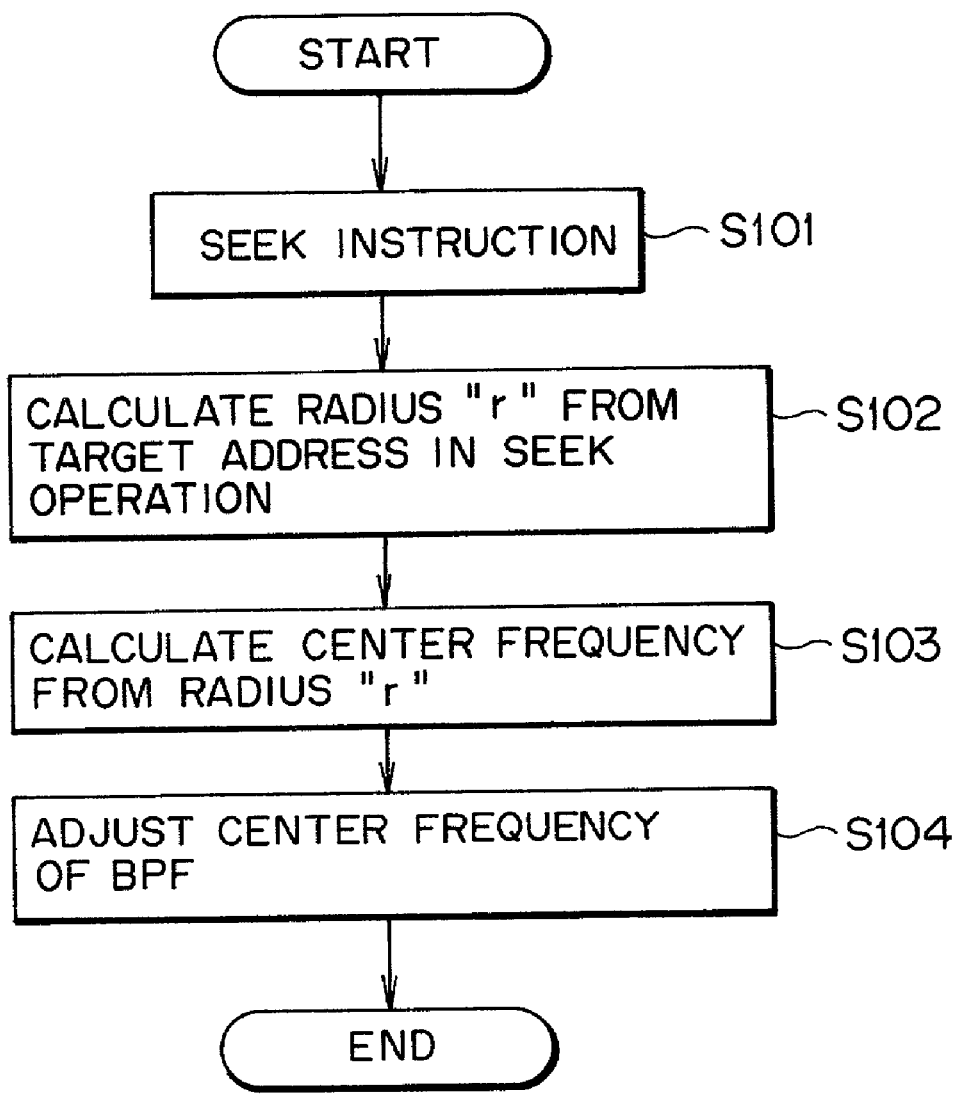
FIG. 5 is a flowchart showing a sequence of operations achieved by a controller shown in FIG. 4.

FIG. 5 shows a flowchart illustrative of a sequence of operations achieved by the controller 20. The controller 20 receives a seek instruction (S101) whereupon it calculates from a target address contained in the seek instruction, a radius r of a position on the optical disk corresponding to the target address (S102). Then, the controller 20 determines by calculation using the calculated radius r, a center frequency of the wobble signal at the target position on the optical disk (S103). Stated more specifically, the controller 20 includes a memory (storage means) 20a, such as a read-only memory (ROM) or a random access memory (RAM) in which is stored in advance a proportional expression: f=a·r (where a is a proportional coefficient, r is the radius and f is the center frequency), which represents a relationship established between the center frequency of wobble signal and the radius of a given position on the optical disk depending on an angular velocity at the given position. The controller 20 calculates the radius r and substitutes the calculated r for r of the proportional expression so that the center frequency f can be obtained. It is also possible to store the relationship between the radius and the center frequency in the memory 20a in the form of a table, in which instance the center frequency corresponding to a given radius can be readily obtained with reference to the table. After detection of the center frequency by calculation, the controller 20 supplies a control signal to the BPF 18q thereby to adjust the center frequency of the BPF 18q (S104).

In the second embodiment, since the center frequency of the wobble signal is detected by calculation achieved by the controller 20, it is possible to reduce the number of parts used in the wobble signal reproducing section 18 while securing reliable reproduction of the wobble signal.

In this embodiment, if the error rate does not reach a desired value when address information is demodulated by the demodulator 18p, with the center frequency of the BPF 18q having been set to the center frequency of wobble signal detected by calculation, a process may be added, in which a predetermined amount of frequency Δf is added to or subtracted from the calculated center frequency to find out an optimum frequency. This ensures that the center frequency of the BPF 18q can be adjusted to an optimum value in a short time even when the calculation accuracy is relatively low.

Certain preferred embodiments of the present invention have been disclosed and described in conjunction with the CAV control. The present invention should by no means be limited to the illustrated embodiments but can be effectively used in an application where frequency variation may occur with respect to the center frequency of the wobble signal. For example, under the CLV control, the center frequency of the wobble signal is normally constant as indicated by the dash-and-dot line shown in FIG. 2. However, immediately after a seek operation, the number of revolutions of the optical disk tends to become unstable, causing the center frequency of the wobble signal to vary or fluctuate. To deal with this problem, it is possible according to the present invention to detect the center frequency of the wobble signal by means of the first BPF 18f (FIG. 3) until the number of revolutions of the optical disk becomes stable after a seek operation, and to set the center frequency of the second BPF 18k (FIG. 3) to the detected center frequency of the wobble signal. This arrangement ensures reliable reproduction of the wobble signal and improves the speed and accuracy of the address information demodulation process. Stated more specifically, the controller 20 first makes a judgment to determine whether or not a seek operation has just finished, then continues to detect the center frequency of the wobble signal until a predetermined period of time has passed after the seek operation, and sets the center frequency (filtering frequency) of the BPF 18k to the detected center frequency of the wobble signal.

Furthermore, the present invention does not limit the drive control method for the optical disk to the CLV control or the CAV control as in the illustrated embodiments, but may include a complex drive control method in which the CLV control and the CAV control are used in combination (for example, in such a manner that a given range of radius of the optical disk is CLV-controlled and another given range of radius of the optical disk is CAV-controlled).

Obviously, various minor changes and modifications of the present invention are possible in the light of the above teaching. It is therefore to be understood that within the scope of the appended claims, the present invention may be practiced otherwise than as specifically described.

What is claimed is:

1. An optical disk device comprising:
   drive means for driving in rotation an optical disk having a wobbled track;
   irradiating means for irradiating a light beam onto the optical disk;
   light receiving means for receiving the light reflected from the optical disk and outputting an electric signal corresponding to the reflected light; and
   wobble signal reproducing means for reproducing, from the output electric signal of the light receiving means, a wobble signal corresponding to a wobble of the track, said wobble signal reproducing means including:
   (a) detection means for detecting a center frequency of the wobble signal including:
      (i) a band-pass filter having a pass band being set to pass the wobble signal within a range of driving in rotation of the optical disk by said drive means, and
      (ii) a frequency detection means for detecting a frequency of the wobble signal which has passed through said band-pass filter, and
   (b) extracting means for extracting the wobble signal from the output electric signal on the basis of the frequency detected by said frequency detection means.

2. The optical disk device according to claim 1, wherein said drive means drives the optical disk at a constant angular velocity.

3. The optical disk device according to claim 1, wherein said drive means drives the optical disk at a constant linear velocity and said detection means performs detection of the center frequency of the wobble signal immediately after a seek operation of said irradiating means.

* * * * *